United States Patent
Durazzo et al.

(10) Patent No.: US 12,493,816 B2
(45) Date of Patent: Dec. 9, 2025

(54) 3-TIER QUANTUM COMPUTING EXECUTION MODEL

(71) Applicant: Dell Products L.P., Round Rock, TX (US)

(72) Inventors: Kenneth Durazzo, Morgan Hill, CA (US); Stephen J. Todd, North Andover, MA (US); Michael Robillard, Shrewsbury, MA (US); Victor Fong, Melrose, MA (US); Brendan Burns Healy, Whitefish Bay, WI (US); Benjamin E. Santaus, Somerville, MA (US); Xuebin He, Westwood, MA (US)

(73) Assignee: Dell Products L.P., Round Rock, TX (US)

( * ) Notice: Subject to any disclaimer, the term of this patent is extended or adjusted under 35 U.S.C. 154(b) by 836 days.

(21) Appl. No.: 17/809,075

(22) Filed: Jun. 27, 2022

(65) Prior Publication Data
US 2023/0419160 A1 Dec. 28, 2023

(51) Int. Cl.
*G06N 10/20* (2022.01)
*G06N 10/80* (2022.01)

(52) U.S. Cl.
CPC ............ *G06N 10/80* (2022.01); *G06N 10/20* (2022.01)

(58) Field of Classification Search
CPC ........ G06N 10/80; G06N 10/00; G06N 10/60; G06N 10/40; G06N 10/20
See application file for complete search history.

(56) References Cited

U.S. PATENT DOCUMENTS

2021/0357797 A1* 11/2021 Karalekas .............. G06N 10/40
2021/0357799 A1* 11/2021 Ducore .................. G06N 10/60
2024/0378085 A1* 11/2024 Ravi ...................... G06F 9/5027

* cited by examiner

*Primary Examiner* — Brian W Wathen
(74) *Attorney, Agent, or Firm* — Workman Nydegger

(57) ABSTRACT

One example method includes evaluating a function invoked by a request that is received at a local classical computing execution environment, and the request also implies performance of a quantum computing function in a quantum computing execution environment, based on an outcome of the evaluating, determining whether or not the function should be run in the local classical computing execution environment, or whether the function should be run in a separate classical computing execution environment, and when the determining indicates that the function should be run in the separate classical computing execution environment, forwarding the request to the separate classical computing environment for execution of the function. The local classical computing execution environment, the separate classical computing execution environment, and the quantum computing execution environment, are respective first, second, and third, tiers of a hybrid computing execution environment.

20 Claims, 4 Drawing Sheets

3-TIER QUANTUM COMPUTING EXECUTION MODEL

FIELD OF THE INVENTION

Embodiments of the present invention generally relate to the execution of hybrid quantum/classical workloads. More particularly, at least some embodiments of the invention relate to systems, hardware, software, computer-readable media, and methods for splitting hybrid quantum/classical workloads among multiple execution tiers.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

Currently, hybrid classical/quantum programs must be submitted as a bundle, that is, a combination of classical computing instructions and quantum computing instructions, to a runtime environment in such a way that does not involve two-way communication back to the submitting code. In some instances, a user may be submitting this bundle from a data center that already has the necessary classical hardware on which to execute at least part of the classical portion of the bundle. Thus, the user is sending work into a cloud computing environment that could be executed using on-premise resources such as hardware, memory, storage, and processing resources. In taking this approach then, the user has not been afforded the opportunity to take advantage of the capabilities and availability of the on-premise resources.

Not only do existing approaches often fail to make effective and efficient use of resources, but requiring the entirety of the classical work in a hybrid algorithm to be performed in the hybrid runtime environment, rather than on-premise, inhibits the ability of the user to design algorithms which use accelerators and other specialized hardware that may be available on-premise.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figures 1, 2:
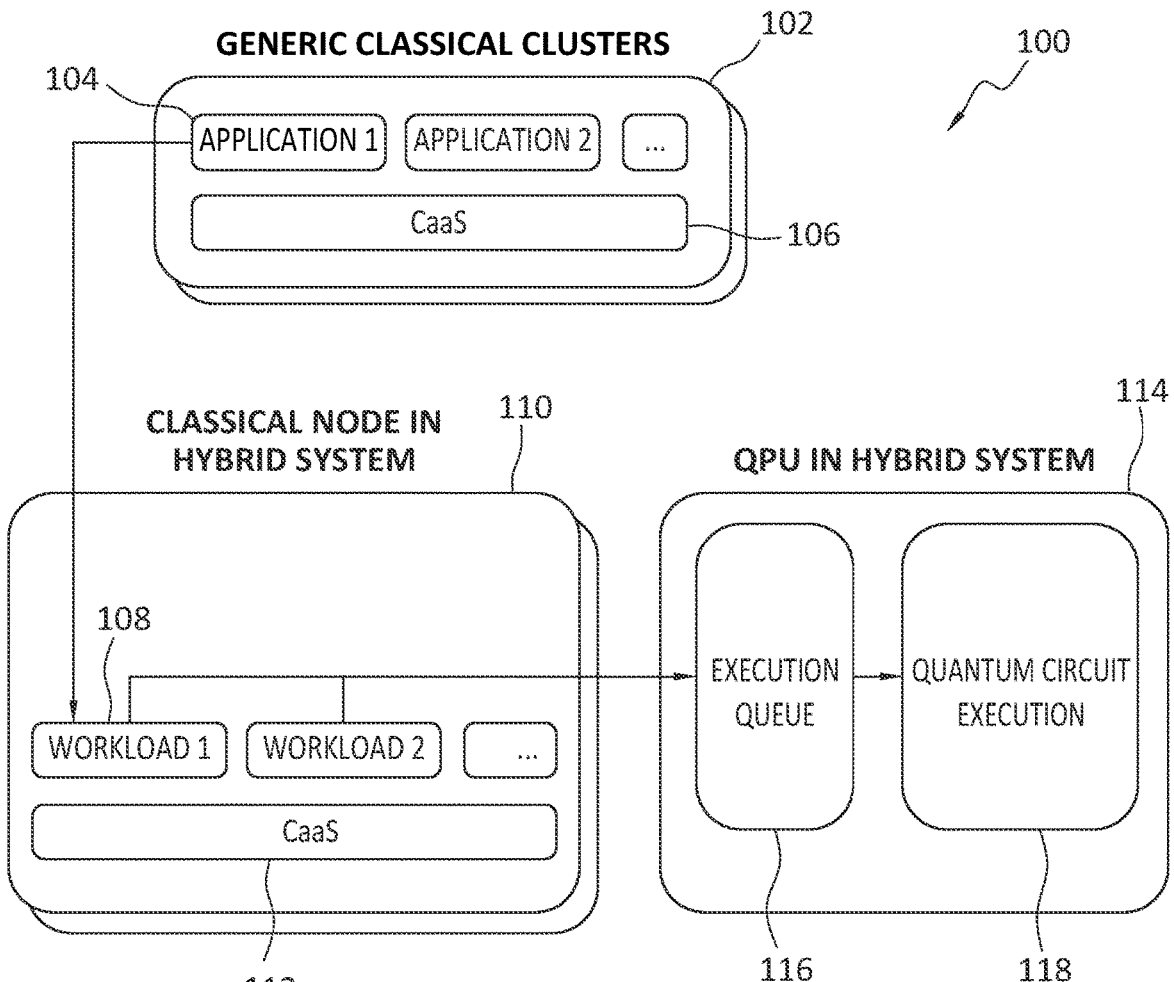
FIG. 1 discloses aspects of an example architecture in connection with which some embodiments of the invention may be employed.
FIG. 2 discloses example Java code for allocating a portion of a workload to a QPU for execution.

Embodiments of the present invention generally relate to the execution of hybrid quantum/classical workloads. More particularly, at least some embodiments of the invention relate to systems, hardware, software, computer-readable media, and methods for splitting hybrid quantum/classical workloads among multiple execution tiers. Some embodiments may thus provide for efficient use of on-premise computing resources.

In general, some example embodiments of the invention are directed to mechanisms for running hybrid classical/quantum programs that utilize a split of the work into multiple tiers. Some particular embodiments may employ a total of three execution tiers, or simply 'tiers,' namely, two tiers of classical computing resources, and one tier of quantum computing resources. Example embodiments may be employed in connection with both QPUs (quantum processing units) and vQPUs (virtual quantum processing units). In general, a vQPU refers to classical software which emulates a quantum processing unit (QPU).

The implementation and use of a second classical tier, in addition to a first classical tier and a quantum tier, may enable some of the work to be performed on-premise, rather than in a cloud that may be co-located with the quantum hardware. The use of this additional classical tier may save time and money for end users who may have hardware acceleration resources available on-premises. Among other things, example embodiments may be directed to methods for breaking part of a workload in a hybrid program into smaller classical/quantum components, and example embodiments may be directed to methods that employ two classical tiers.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one embodiment of the invention may employ an additional classical tier to take advantage of on-premise resources and may improve the overall speed and efficiency and execution of a hybrid quantum/classical workload. An embodiment may reduce latency in the performance of a hybrid workload by allocating some of the work to local, rather than remote, execution resources. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, computing operations. Example computing operations according to some embodiments may be performed in on-premise environments, cloud computing environments, or in a combination of these. Example cloud computing environments may comprise private clouds, public clouds, or a combination of these. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment. Computing environments may comprise, for example, both conventional and quantum components. Such components may be virtual components and/or physical components. Example components that may perform workloads according to some embodiments may include, but are not limited to, physical hardware components such as memory, storage, and processors, as well as VMs (virtual machines), containers, and vQPUs. The scope of the invention is not limited to any particular type, or combination, of computing resources or components.

With particular attention now to FIG. 1, details are provided concerning aspects of an example architecture, denoted generally at 100, in connection with which embodiments of the invention may be employed. As shown, the example architecture 100 may comprise one or more generic classical clusters 102. Each of the clusters 102 may host one or more applications 104 that may operate to create new and modified data, and the clusters 102 may also each implement, provide, and/or subscribe to, a CaaS (Container as a Service) platform 106.

The CaaS platform 106 may operate to orchestrate and coordinate the performance of various workloads 108 associated with, or implied by, the operation of one or more of the applications 104. For example, an application 104, which may be a containerized application, may require the performance of various operations in order to carry out a function of the application 104. These operations may collectively form a workload, such as the workload 108, that may be executable by a group of one or more containers.

In more detail, a workload 108 may be performed in part by a classical node 110 of a hybrid computing system. Similar to a generic classical cluster 102, the classical node 110 may also implement, provide, and/or subscribe to, a CaaS (Container as a Service) platform 112 that may operate to orchestrate and coordinate the performance of one or more portion(s) of the workload 108 to be performed at the classical node 110.

As further indicated in FIG. 1, one or more portions of the workload 108 may be orchestrated to a QPU 114 of a hybrid computing system. The QPU 114 may include an execution queue 116 that identifies all the workload portions that have been assigned to the QPU 114 for performance. The workload portions in the execution queue 116 may then be executed using quantum resources of the QPU 114. Particularly, the QPU 114 may provide for quantum circuit execution 118 of the workload portions in the execution queue 116. FIG. 2 discloses example Java code 200 for allocating a portion of a workload to a QPU for execution.

B. Aspects of An Example Tiered Approach to Quantum Execution

B.1 Code Marking

Various inputs, possibly provided by a user, may be employed by example embodiments to enable a determination to be made as to whether or not a workload, or a portion of a workload, should be split between two classical computing tiers. Inputs may also be employed to determine which portion(s), if any, of a workload should be executed by a QPU. Thus, at least some example embodiments may implement a three tiered execution structure that includes two classical computing tiers, and one quantum computing tier.

In some embodiments, the user inputs may be added to the code that is to be executed, as code markers, or annotations. These code markers, which may be added during and/or after development of the code, may comprise various user preferences, constraints, user intent, and/or any other information that may be employed to guide a tiering decision. The code markers may concern, among other things, on-premise execution, cloud execution, classical computing and associated classical computing resources, and/or, quantum computing and associated quantum computing resources.

In more detail, and with regard to user intentions concerning tiering and execution of code, the user intent may be specified as part of the annotation or code markers, so that the developer can specify requirements directly at coding time. Such requirements, which are examples of user inputs, may include, but are not limited to, classical user intents or constraints such as budget, and execution time, for example, as well as various factors that are specific to quantum computing, such as, but not limited to, QPU type, accuracy rate, and the number of shots. Note that quantum computing circuits may run either on QPUs or vQPUs. One execution of an algorithm may involve multiple quantum components, each of which may consist of some number of shots. Each quantum component may require a number of shots in order to obtain a desired probability distribution of results. To illustrate, 100 shots means that the algorithm or other code is run 100 times in order to obtain a desired probability distribution for the results, or output, of the algorithm or other code.

In connection with code marking, one or more circuits may also be generated within the program, or code, that is to be executed. That is the circuit(s) needed to run the code, which may be written in a programming language such as Python for example, may be described within the code itself. The user may merge the circuit description with the code markers to construct the circuits. Ultimately, the circuits may be transpiled, or mapped, into quantum assembly language and then be executed in one or more QPUs.

As part of the operation of some example embodiments, the circuit generated within the code, or program, may also be evaluated to determine various quantum computing characteristics. Such quantum computing characteristics may include, for example, entanglement characteristics, gates dependency, the number of qubits, the possibility of splitting a circuit into smaller circuits, and the possibility of rearranging circuit gates, for example. In this regard, it is noted that the number of shots needed to meet user requirements may be a function of one or more of the aforementioned quantum computing characteristics. When the code markers have been added, and circuit(s) generated within the program, the program, including the code marker, may be submitted for execution.

B.2 Orchestration

Example embodiments may provide for the implementation and use of an orchestration engine. Some example embodiments of an orchestration engine may be, or comprise, an 'interceptor' as discussed elsewhere herein. In some embodiments, an orchestration engine may run in a local container. In other embodiments, the orchestration engine may comprise a discrete entity that is able to communicate, and exchange information, code, and data, with a container, such as a local container for example.

In operation, when orchestration engine receives the program, or code, the orchestration engine may determine if remote execution of at least a portion of the code may be beneficial, in terms of parameters such as cost, efficiency, and on-premise resource utilization, for example, and where to execute the remote components based on considerations such as, but not limited to, user specified intents as may be embodied in the code, and a quantum circuit evaluation.

Note that the selection, such as by an orchestration engine or other entity for example, of a hybrid system as a whole, may be different from simply selecting a quantum computing environment, such as a QPU or vQPU execution environment. Where a hybrid execution environment, which may include both classical and quantum components, is to be defined and implemented, additional selection factors, related to the classical components, may need to be introduced. Such additional selection factors may include, for example, classical computation availability and capabilities such as, but not limited to, computational power, memory space, accelerators such as GPUs (graphics processing units), and the classical environment and QPU me be considered as a single computing environment.

Embodiments of the invention may also provide an orchestration engine, or other entity, that may be operable to automatically, and dynamically, construct a hybrid computing system, for example, if none of the hybrid systems that may be available can satisfy the need(s) of the user intent. The automatic, and dynamic, construction of a hybrid computing system may comprise, for example, evaluating both classical and quantum components available in on-premise environments and cloud environments, as well as evaluating the latency between computing components. When selected, automation may be used by the orchestration engine to deploy the classical workload, and connect the classical workload to a corresponding resource, which may be on-premise resource such as a GPU, for example.

With further attention to the automatic construction of a hybrid computing environment, suppose that a platform, which may comprise one or more nodes, is not being executed in a classical environment, an automation approach may automatically provision this platform and make the classical computation environment a part of the platform. A similar approach may be taken in example embodiments, in which automation, or automated provisioning, may be specifically targeted to a three tier type hybrid system, examples of which are disclosed herein.

If the orchestration engine determines that remote execution of a portion of a workload is beneficial in one or more respects, the orchestration engine may then produce and orchestrate a separate container, which may or may not be a local container or a remote container, for execution of a classical component of the workload. Where the separate container is a remote container, local invocation of the local container for performance of the workload may then be turned into remote procedure calls directed to the separate container. Otherwise, local invocation may be maintained to utilize on-premises infrastructure.

Note that quantum circuits must be transpiled before running on either a QPU or vQPU. After any needed transpilation is performed, the remote procedures may then execute the remote classical, and remote quantum, components and then return results to the first tier classical component. Should the user want to use on-premises accelerators or other hardware to execute an iterative hybrid algorithm, the remote classical component may also be used as a "middle-man" by way of which a classical computing components such as a local container may communicate with the remote quantum environment.

B.3 Aspects of an Example Architecture and Methods

Figure 3:
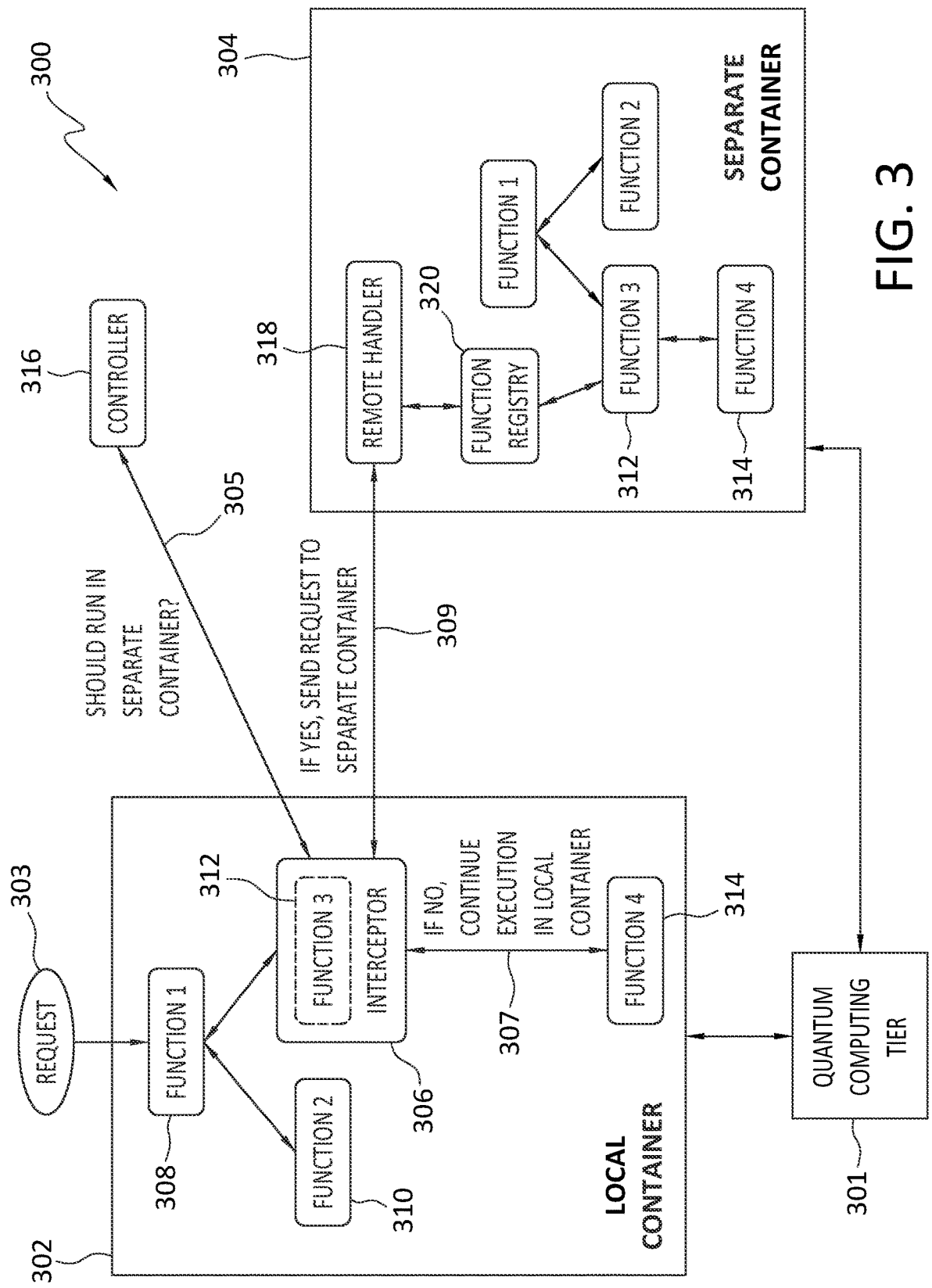
FIG. 3 discloses an example hybrid computing execution environment according to some example embodiments.

With reference now to FIG. 3, details are provided concerning an example architecture and method according to some example embodiments. For example, some embodiments are directed to approaches for implementing a three-tier, or other multi-tier, quantum computing execution model.

In the particular example of FIG. 3, a configuration 300 is disclosed that may include a quantum computing tier 301, and in which a workload, or a portion of a workload, may be split up among two different tiers, or containers, namely, a local container 302 (tier 1) and a separate container 304 (tier 2). In some embodiments, the local container 302 and/or the separate container 304 may both be executed at an on-premise location. In other embodiments, the separate container 304 may executed at a location or site that is remote with respect to the site where the local container 302 is executed. Both the local container 302 and the separate container 304 may be classical computing components, and either or both of the local container 302 and the separate container 304 may be operable to communicate with a quantum computing component, or tier, 301. As well, in some embodiments, the functionalities implemented by the separate container 304 may otherwise be implemented by the local container 302 in the absence of the tiered approach disclosed in FIG. 3.

The orchestration engine may be part of a platform. That is, the orchestration engine may be located in any of the classical computation nodes, or containers, and all of these nodes may be joined together to collectively form a platform. In this example then, the classical computation operations of a local container and a separate container may then be able to execute on top of this platform.

In general, and with continued reference to the example of FIG. 3, an interceptor component 306, which may or may not run in the local container 302 and may or may not comprise, or be implemented in, an orchestration engine, may determine what functions, if any, associated with the local container 302 should instead run in the separate container 304. This determination may be performed, for example, in response to a request 303 received, possibly from an application, by the local container 302. In more detail, the request 303 may specify that various functions are needed to be performed to carry out a workload of an application. Thus, a remote procedural invocation is disclosed in which a portion of a workload may be executed in a first tier (local container 302), and another portion of a workload may be executed in a second tier (separate container) 304. As noted earlier, another portion of the workload may be executed in a third, quantum, tier 301.

In the illustrative example of FIG. 3, there are four functions 308, 310, 312, and 314, that may be needed to carry out the request 303. More, or fewer, functions may be associated with other requests. Note that any of the containers in FIG. 3 may be implemented in alternative forms such as, but not limited to, a VM for example, or other execution environment(s).

As shown in FIG. 3, the request 303 may result in the invocation of a function 308 which, in turn, may invoke the function 310 and the function 312. Absent the presence of the interceptor 306, the function 312 would, in turn, invoke function 314. However, with employment of an interceptor 306 according to some example embodiments, the interceptor 306 may evaluate 305 the function 312 to determine if the function 312 should run in a separate container. The evaluation 305 may involve, for example, determining whether or not the type and amount of local resources available are adequate to support execution of the function 312, and/or determining whether or not a latency associated with outsourcing the function 312 to a separate container would be acceptable. Further, the evaluation 305 may take into consideration any functions, such as 314, which may be invoked by the function 312. These additional functions will require resources for their execution, and could introduce considerations such as latency for example, and so may play a role in the evaluation 305 process. As well, the evaluation 305 may comprise inspecting any code markers associated with the function 312, and making a determination to send, or not, a request including the function to a separate container, based in whole or in part on the code markers. For example, if a code marker indicates that the type/amount of resources needed for execution of a function do not exist at the local container 302, the request may be sent to a separate container.

The evaluation 305 may be performed in conjunction with a controller 316. In some embodiments, the controller 316 may provide various criteria and other information to facilitate the evaluation 305, whether the evaluation 305 is performed by the interceptor 306, the controller 316, or collectively by both.

If the evaluation 305 indicates that the function 312 need not, or should not, be performed in a separate container, the function 312, and the function 314 invoked by the function 312, may be performed 307 in the local container 302. Alternatively, if the evaluation 305 indicates that the function 312 could, or should, be performed in a separate container, the separate container 304 may be automatically created, and the request 303 forwarded 309 to a remote handler 318 of the separate container 304. In some embodiments, the remote container 304 may already exist prior to a determination that a function should be sent from the local container 302 for execution elsewhere.

The remote container 304 may include a function registry 320 that registers any functions running, or to be run, at the remote container 304. After a function, such as the function 312 in the present example, is registered at the function registry 320, the function 312 may be run in the separate container 304. For example, when the function 312 is invoked by the function 308, an RPC may be generated, such as by the local container 302, and sent to call the separate container 304 to perform the function 312, and to perform any function(s) that may be invoked by the function 312.

In the example of FIG. 3, the functions 308 and 310 are shown in the separate container 304 for context, but are actually run in the local container 302. In connection with the execution of the function 312 in the separate container 304, the function 312 may invoke function 314, which may also then be executed in the separate container 304.

Thus, with reference to the example of FIG. 3, when a determination is made that the function 312 will be sent to another container for execution, a three tier quantum computing execution model is implemented, and used, that includes a first tier for classical computing (container 302), a second tier for classical computing (container 304), and a third tier 301 for quantum computing. Either of the first tier and the second tier may send a quantum computing request to the third tier.

C. Example Methods

Figure 4:
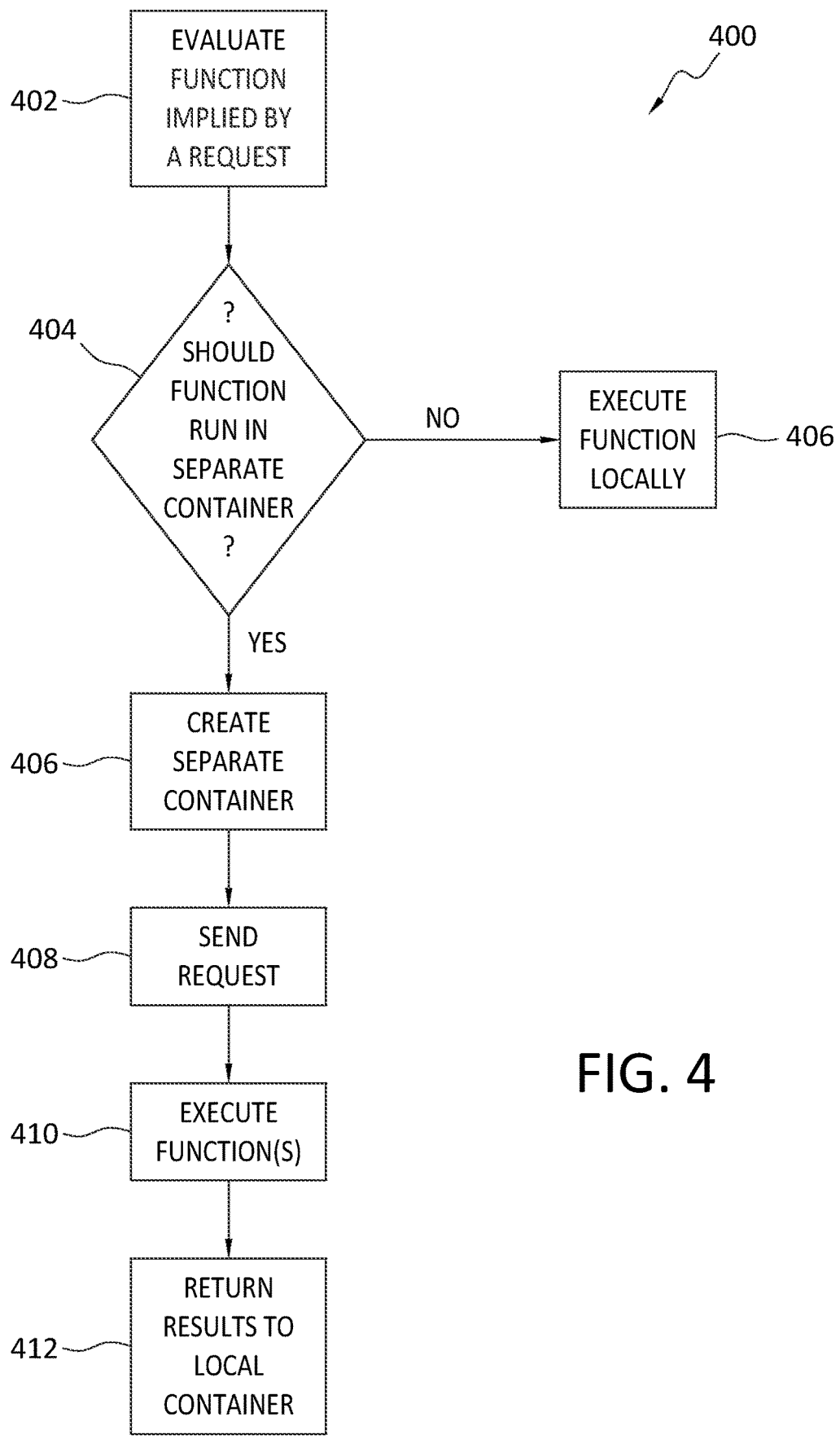
FIG. 4 discloses an example method according to some embodiments.

It is noted with respect to the disclosed methods, including the example methods of FIGS. 3 and 4, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 4, details are provided concerning an example method 400 according to some embodiments. Part, or all, of the method 400 may be performed by, and/or at the direction of, an orchestration engine, although that is not necessarily required. As well, part of the method 400 may be performed by a classical computing container.

The method 400 may begin at 402 with the evaluation, such as by an orchestration engine for example, of a function implied by a request received by a classical computing container. Based on the outcome of the evaluation 402, a determination 404 may be made, such as by an orchestration engine, as to whether or not a function, or functions, implicated by the request should be performed locally, such as at the container that received the request, or performed at a separate classical computing container.

If a determination 404 is made that the function should not, and/or need not, be performed in a separate classical computing container, that function may be executed locally, that is, at the local classical computing container that received the request. On the other hand, if a determination 404 is made that that the function should be run in a separate classical computing container, a separate classical computing container may be created 406, possibly by, or at the direction of, an orchestration engine for example. The creation 406 of the separate classical computing container may comprise the automatic provisioning of the separate classical computing container. In some embodiments, the separate classical computing container may already exist and, as such, the operation 406 may be omitted in such embodiments.

Next, the request that was evaluated at 402, may then be sent 408, such as by an orchestration engine, to the separate container. The separate container may then execute 410 the function, and may also execute any additional functions invoked by that function. Finally, results generated by the execution 410 of the function(s) may be transmitted 412 by the separate container to the local container.

D. Further Discussion

As will be apparent from this disclosure, example embodiments may possess a variety of useful features and functionalities. For example, an embodiment may provide for selection of hybrid system computing services, such as the example three tier configuration disclosed herein, instead of QPU or vQPU resources. An embodiment may operate to automatically select, and create, a hybrid system that includes existing classical and quantum components, which may be useful for cloud computing service vendors to provide hybrid computation service, so as to enable their customers to select these services at runtime from on-premise, that is, first tier, environments. An embodiment may provide for 3-tier execution and orchestration design based on intelligent orchestration and optimization, and simplified by the use of code markers and automation engines. An embodiment may implement classical-to-classical intermittent communication in a 3-tier model so that the first tier classical computing component does not need to wait for end-to-end algorithm to complete on 2nd (classical) and 3rd (quantum) tier. An embodiment may operate to reduce network latency between a classical component, such as a second tier component, and a third tier quantum component. An embodiment may implement a code marking mechanism that utilizes optimization, user intent, and global telemetry.

E. Further Example Embodiments

Following are some further example embodiments of the invention. These are presented only by way of example and are not intended to limit the scope of the invention in any way.

Embodiment 1. A method, comprising: evaluating a function invoked by a request, wherein the request is received at a local classical computing execution environment, and the request also implies performance of a quantum computing function in a quantum computing execution environment; based on an outcome of the evaluating, determining whether or not the function should be run in the local classical computing execution environment, or whether the function should be run in a separate classical computing execution environment; when the determining indicates that the function should be run in the separate classical computing execution environment, forwarding the request to the separate classical computing environment for execution of the function; and when the determining indicates that the function should be run in the local classical computing execution environment, executing the function in the local classical computing environment, wherein, the local classical computing execution environment, the separate classical computing execution environment, and the quantum computing execution environment, respectively comprise a first tier, second tier, and third tier of a hybrid computing execution environment.

Embodiment 2. The method as recited in embodiment 1, wherein the local classical computing execution environment, and the separate classical computing execution environment, each comprise a respective container, or virtual machine.

Embodiment 3. The method as recited in any of embodiments 1-2, wherein a program that generates the request includes one or more code markers.

Embodiment 4. The method as recited in embodiment 3, wherein one of the code markers comprises a classical user intent, and another of the code markers comprises a quantum-computing specific factor.

Embodiment 5. The method as recited in any of embodiments 1-4, wherein a program that generates the request includes a definition of a quantum circuit.

Embodiment 6. The method as recited in any of embodiments 1-5, wherein the determining is based in part on a type, and availability, of resources at the local classical computing execution environment.

Embodiment 7. The method as recited in any of embodiments 1-6, wherein the hybrid computing execution environment is constructed based in part on an outcome of the evaluating.

Embodiment 8. The method as recited in any of embodiments 1-7, wherein the separate classical computing execution environment is created automatically based on a determination that the function should be run in the separate classical computing execution environment.

Embodiment 9. The method as recited in any of embodiments 1-8, wherein the evaluating comprises inspecting one or more code markers present in a program that generated the request.

Embodiment 10. The method as recited in any of embodiments 1-9, wherein the separate classical computing execution environment comprises another local classical computing execution environment, and one or both of the local classical computing execution environment and the another local classical computing execution environment, are operable to communicate with the quantum computing execution environment.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
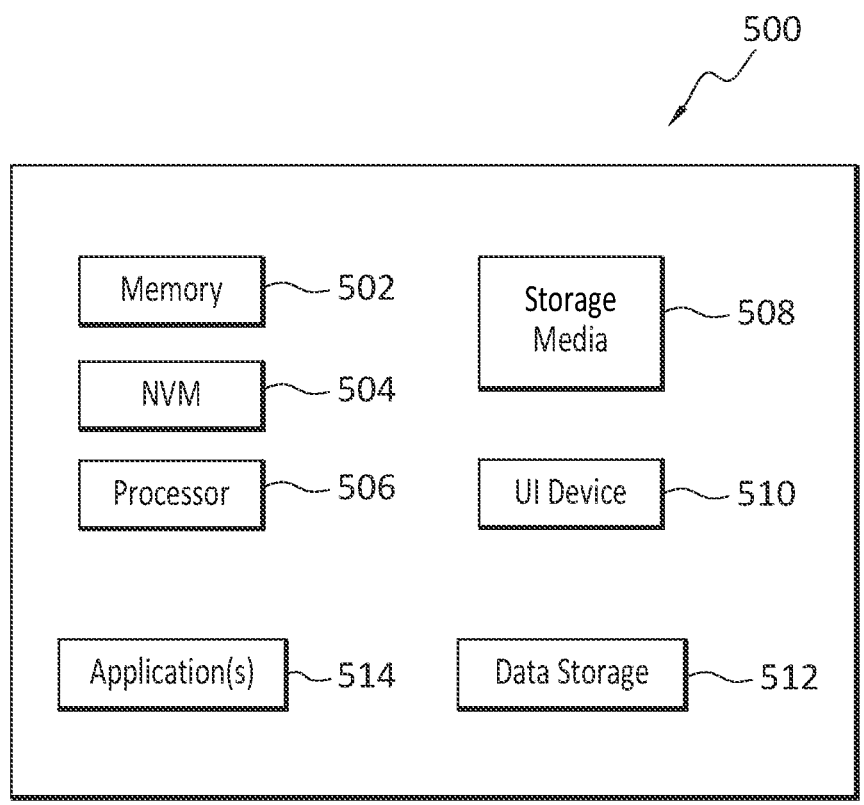
FIG. 5 discloses an example computing entity operable to perform any of the disclosed methods, processes, and operations.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM) that VM may constitute a virtualization of any combination of the physical components disclosed in FIG. 5. Computing devices employed in connection with embodiments of the invention may comprise QPUs and/or vQPUs.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI (user interface) device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
evaluating a function invoked by a request, wherein the request is received at a local classical computing execution environment, and the request also implies performance of a quantum computing function in a quantum computing execution environment;
based on an outcome of the evaluating, determining whether or not the function should be run in the local classical computing execution environment, or whether the function should be run in a separate classical computing execution environment;
when the determining indicates that the function should be run in the separate classical computing execution environment, forwarding the request to the separate classical computing environment for execution of the function; and
when the determining indicates that the function should be run in the local classical computing execution environment, executing the function in the local classical computing environment, wherein, the local classical computing execution environment, the separate classical computing execution environment, and the quantum computing execution environment, respectively comprise a first tier, second tier, and third tier of a hybrid computing execution environment.

2. The method as recited in claim 1, wherein the local classical computing execution environment, and the separate classical computing execution environment, each comprise a respective container, or virtual machine.

3. The method as recited in claim 1, wherein a program that generates the request includes one or more code markers.

4. The method as recited in claim 3, wherein one of the code markers comprises a classical user intent, and another of the code markers comprises a quantum-computing specific factor.

5. The method as recited in claim 1, wherein a program that generates the request includes a definition of a quantum circuit.

6. The method as recited in claim 1, wherein the determining is based in part on a type, and availability, of resources at the local classical computing execution environment.

7. The method as recited in claim 1, wherein the hybrid computing execution environment is constructed based in part on an outcome of the evaluating.

8. The method as recited in claim 1, wherein the separate classical computing execution environment is created automatically based on a determination that the function should be run in the separate classical computing execution environment.

9. The method as recited in claim 1, wherein the evaluating comprises inspecting one or more code markers present in a program that generated the request.

10. The method as recited in claim 1, wherein the separate classical computing execution environment comprises another local classical computing execution environment, and one or both of the local classical computing execution environment and the another local classical computing execution environment, are operable to communicate with the quantum computing execution environment.

11. A non-transitory storage medium having stored therein instructions that are executable by one or more hardware processors to perform operations comprising:

evaluating a function invoked by a request, wherein the request is received at a local classical computing execution environment, and the request also implies performance of a quantum computing function in a quantum computing execution environment;

based on an outcome of the evaluating, determining whether or not the function should be run in the local classical computing execution environment, or whether the function should be run in a separate classical computing execution environment;

when the determining indicates that the function should be run in the separate classical computing execution environment, forwarding the request to the separate classical computing environment for execution of the function; and when the determining indicates that the function should be run in the local classical computing execution environment, executing the function in the local classical computing environment, wherein, the local classical computing execution environment, the separate classical computing execution environment, and the quantum computing execution environment, respectively comprise a first tier, second tier, and third tier of a hybrid computing execution environment.

12. The non-transitory storage medium as recited in claim 11, wherein the local classical computing execution environment, and the separate classical computing execution environment, each comprise a respective container, or virtual machine.

13. The non-transitory storage medium as recited in claim 11, wherein a program that generates the request includes one or more code markers.

14. The non-transitory storage medium as recited in claim 13, wherein one of the code markers comprises a classical user intent, and another of the code markers comprises a quantum-computing specific factor.

15. The non-transitory storage medium as recited in claim 11, wherein a program that generates the request includes a definition of a quantum circuit.

16. The non-transitory storage medium as recited in claim 11, wherein the determining is based in part on a type, and availability, of resources at the local classical computing execution environment.

17. The non-transitory storage medium as recited in claim 11, wherein the hybrid computing execution environment is constructed based in part on an outcome of the evaluating.

18. The non-transitory storage medium as recited in claim 11, wherein the separate classical computing execution environment is created automatically based on a determination that the function should be run in the separate classical computing execution environment.

19. The non-transitory storage medium as recited in claim 11, wherein the evaluating comprises inspecting one or more code markers present in a program that generated the request.

20. The non-transitory storage medium as recited in claim 11, wherein the separate classical computing execution environment comprises another local classical computing execution environment, and one or both of the local classical computing execution environment and the another local classical computing execution environment, are operable to communicate with the quantum computing execution environment.

\* \* \* \* \*